US011274626B2

(12) United States Patent
Tufail et al.

(10) Patent No.: US 11,274,626 B2
(45) Date of Patent: Mar. 15, 2022

(54) BORE PORTION FOR RECEIVING A RECIPROCATING PISTON

(71) Applicant: Ford Global Technologies, LLC, Dearborn, MI (US)

(72) Inventors: Khizer Tufail, London (GB); Arup Kumar Gangopadhyay, Novi, MI (US); David Skipp, Brentwood (GB); Thomas Reddyhoff, London (GB); Sorin-Cristian Vladescu, London (GB); Roland Paul Stark, Hitchin (GB)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 16/583,114

(22) Filed: Sep. 25, 2019

(65) Prior Publication Data

US 2020/0095951 A1 Mar. 26, 2020

(30) Foreign Application Priority Data

Sep. 26, 2018 (GB) .................................. 1815665

(51) Int. Cl.
*F02F 1/00* (2006.01)
*F16J 10/04* (2006.01)

(52) U.S. Cl.
CPC .............. *F02F 1/004* (2013.01); *F16J 10/04* (2013.01)

(58) Field of Classification Search
CPC ...... F02F 1/004; F02F 1/20; F02F 3/00; F02F 2003/0007; F16J 10/04; F02B 75/04
See application file for complete search history.

(56) References Cited

U.S. PATENT DOCUMENTS 6,095,690 A * 8/2000 Niegel ................ F16C 33/1075
384/293
7,104,240 B1 * 9/2006 Vuk ......................... F02F 1/20
123/193.2
(Continued)

FOREIGN PATENT DOCUMENTS

CN 105904068 A 8/2016
DE 10355685 A1 7/2005
(Continued)

OTHER PUBLICATIONS

Great Britain Intellectual Property Office, Combined Search and Examination Report under Sections 17 and 18(3) Issued in Application No. GB1815665.3, dated Mar. 6, 2019, 5 pages.
(Continued)

*Primary Examiner* — Joseph J Dallo
*Assistant Examiner* — Kurt Philip Liethen
(74) *Attorney, Agent, or Firm* — Geoffrey Brumbaugh; McCoy Russell LLP (57) ABSTRACT

Methods and systems are provided for a bore. In one example, a system includes a bore portion for receiving a reciprocating piston, the bore portion having first and second ends between which the piston travels in an axial direction. The bore portion comprises a plurality of recesses, axially spaced apart, and formed in a piston facing surface of the bore portion at a plurality of axial positions, with at least one recess being provided at each axial position. Widths of the plurality of recesses decrease in the axial direction away from a mid-stroke position toward the first and second ends, and depths of the plurality of recesses increase in the axial direction away from the mid-stroke position toward the first and second ends.

15 Claims, 8 Drawing Sheets

(56) References Cited

U.S. PATENT DOCUMENTS

| | | | |
|---|---|---|---|
| 7,399,122 B2* | 7/2008 | Fujita | F16C 9/02 |
| | | | 384/276 |
| 8,231,277 B2* | 7/2012 | Morales Espejel | ......................... |
| | | | F16C 33/1075 |
| | | | 384/293 |
| 8,708,567 B2* | 4/2014 | Lee | F16C 33/103 |
| | | | 384/293 |
| 9,482,153 B2* | 11/2016 | Bethel | F02F 1/186 |
| 10,337,615 B2* | 7/2019 | Pegg | F16J 9/12 |
| 2003/0021711 A1 | 1/2003 | Klink et al. | |
| 2006/0278071 A1 | 12/2006 | Leweux et al. | |
| 2012/0132069 A1* | 5/2012 | Roh | F02F 1/20 |
| | | | 92/153 |
| 2014/0345453 A1* | 11/2014 | Oh | F02F 1/004 |
| | | | 92/169.1 |

FOREIGN PATENT DOCUMENTS

| | | |
|---|---|---|
| DE | 102014008981 A1 | 12/2015 |
| EP | 1231393 A1 | 8/2002 |
| GB | 2560902 A | 10/2018 |
| WO | 2012125097 A1 | 9/2012 |

OTHER PUBLICATIONS

China National Intellectual Property Administration, Office Action and Search Report Issued in Application No. 201880021651.5, dated Mar. 25, 2021, 11 pages. (Submitted with Partial Translation).

* cited by examiner

BORE PORTION FOR RECEIVING A RECIPROCATING PISTON

CROSS REFERENCE TO RELATED APPLICATION

The present application claims priority to United Kingdom patent application No. 1815665.3, filed on Sep. 26, 2018. The entire contents of the above-listed application are hereby incorporated by reference for all purposes.

BACKGROUND SUMMARY

An internal combustion engine may comprise one or more reciprocating pistons, which may be lubricated to reduce the friction as the piston slides within a cylinder bore. Lubricated sliding contacts, such as between piston rings of the piston and an inner surface of the cylinder bore, may experience frictional losses due to the shear forces generated in the lubricant, contact between surface asperities, and boundary contacts caused by additives in the lubricant.

It is desirable to reduce the friction between the piston rings and the inner surface of the cylinder to increase the efficiency of the engine and reduce wear between engine components. The friction between the components may be determined by a number of factors, which include the operational parameters of the engine and the configuration of each of the sliding surfaces. For example, the frictional coefficient between sliding components may be determined using the Stribeck curve, which is used to categorize the frictional properties between two surfaces as a function of the viscosity of the lubricant and the relative speed between the components per unit load. As such, friction may be minimized by operating at the minimum point on the Stribeck curve, which defines the transition between hydrodynamic lubrication and mixed lubrication. However, it is difficult to maintain operation at the minimum point on the Stribeck curve across the full piston stroke as a result of the low relative speed between the piston and the cylinder at the extremes of the range of movement of the piston.

In one example, the issues described above may be addressed by a system, comprising a bore portion for receiving a reciprocating piston, the bore portion having first and second ends between which the piston travels in an axial direction, wherein the bore portion comprises a plurality of recesses, axially spaced apart, formed in a piston facing surface of the bore portion at a plurality of axial positions, with at least one recess being provided at each axial position, and wherein widths of the plurality of recesses decrease in the axial direction away from a mid-stroke position toward the first and second ends, and wherein depths of the plurality of recesses increase in the axial direction away from the mid-stroke position toward the first and second ends. In this way, surface features of the bore portion, including the recesses, may be adjusted in size and number to enhance lubrication of the piston to minimize frictional losses.

As one example, the at least one recess at each axial position may define a total recess volume at each axial position. The total recess volume at each axial position may vary progressively along the axial length of the bore portion, e.g. with the total recess volume at each axial position increasing away from a mid-stroke position and towards the first and second ends of the bore portion.

The mid-stroke position may correspond to a point at which the velocity of the piston is maximum. The mid-stroke position may correspond to the position of a piston ring when the velocity of the piston is maximum. Accordingly, the mid-stroke position may not be exactly midway between the first and second ends of the bore portion, although the mid-stroke position may be close to a midway point. The velocity of the piston may be zero at the first and second ends of the bore portion, e.g. the first and second ends of the bore portion may be defined by the extent of travel of the piston ring.

The recesses may be distributed in the axial direction. The recesses may also be distributed in a circumferential direction of the bore portion if there is more than one recess at each axial position.

There may be a transition region between the mid-stroke position and each of the first and second ends. Ends of the transition region may be spaced apart from the mid-stroke position and each of the first and second ends. The transition region may extend lengthwise over a portion of the bore portion or it may be a point along the length of the bore portion. In one example, a first transition region is arranged between the first end and the mid-stroke and a second transition region is arranged between the second end and the mid-stroke.

A full film lubrication zone may be defined between the transition regions either side of the mid-stroke position. A full film lubrication regime may occur between the piston and the bore portion in the full film lubrication zone.

An internal combustion engine, reciprocating machine or cylinder liner may comprise the aforementioned bore portion. For example, the cylinder may be provided in a reciprocating engine (such as an internal combustion engine), a reciprocating pump or any other machine with a piston that slidably reciprocates in a bore portion of the machine. The bore portion may be part of a cylinder for receiving the piston.

According to another aspect of the present disclosure, there is provided a method of manufacturing a bore portion for receiving a reciprocating piston, the bore portion having first and second ends between which the piston travels in an axial direction, wherein the method comprises forming a plurality of axially spaced apart recesses in a piston facing surface of the bore portion at a plurality of axial position, with at least one recess being provided at each axial position. Each recess may comprise a width in the axial direction of the bore portion and each recess may comprise a depth perpendicular to the piston facing surface. The widths of the recesses reduce in the axial direction away from a mid-stroke position between the first and second ends and the depths of the recesses increase in the axial direction away from the mid-stroke position.

The at least one recess at each axial position may define a total recess volume at each axial position. The total recess volume at each axial position may vary progressively along the axial length of the bore portion, (e.g., with the total recess volume at each axial position increasing away from a mid-stroke position and towards the first and second ends of the bore portion).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
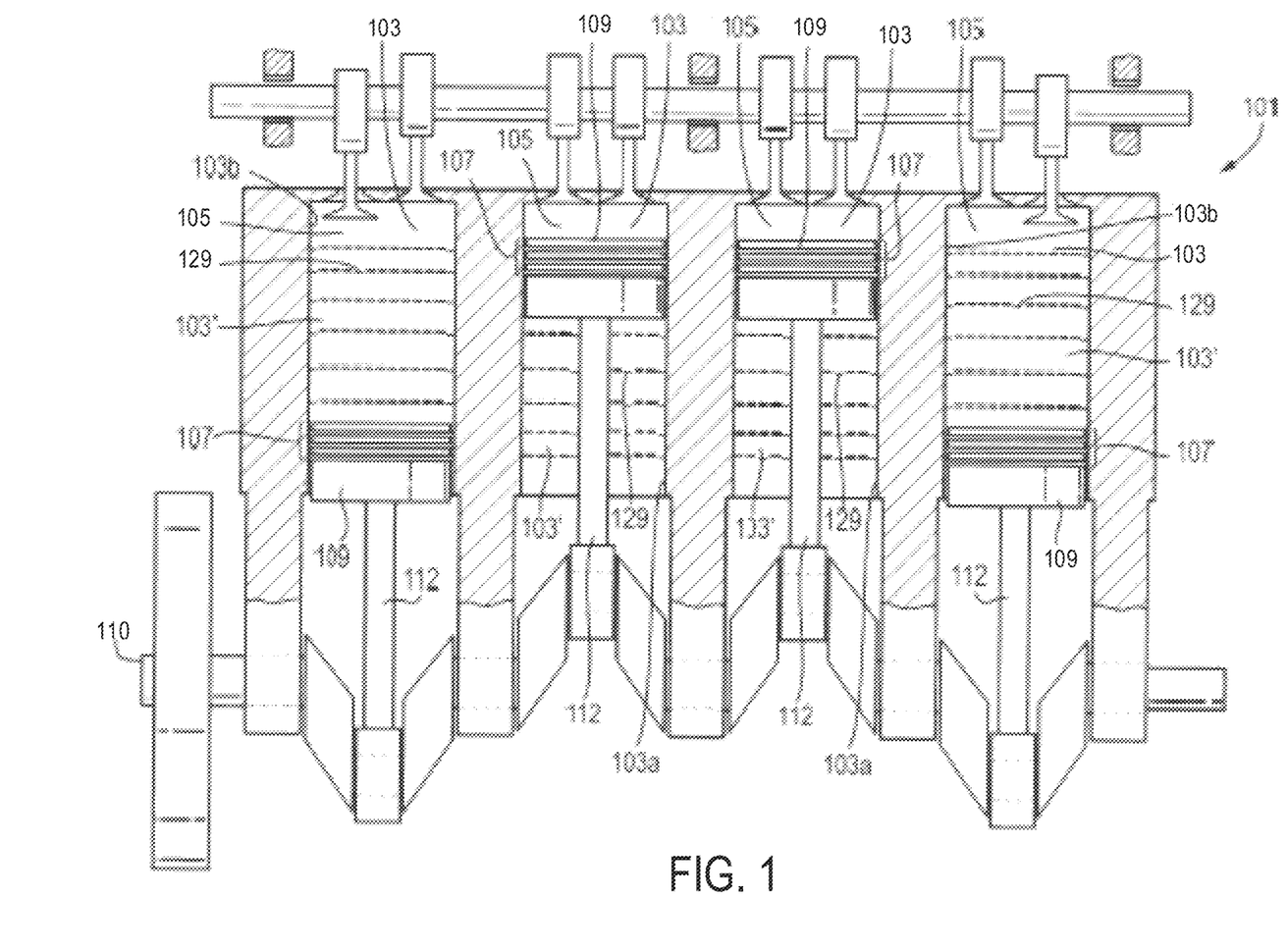
FIG. 1 is a schematic cross-sectional view through an engine according to arrangements of the present disclosure.
Figure 2:
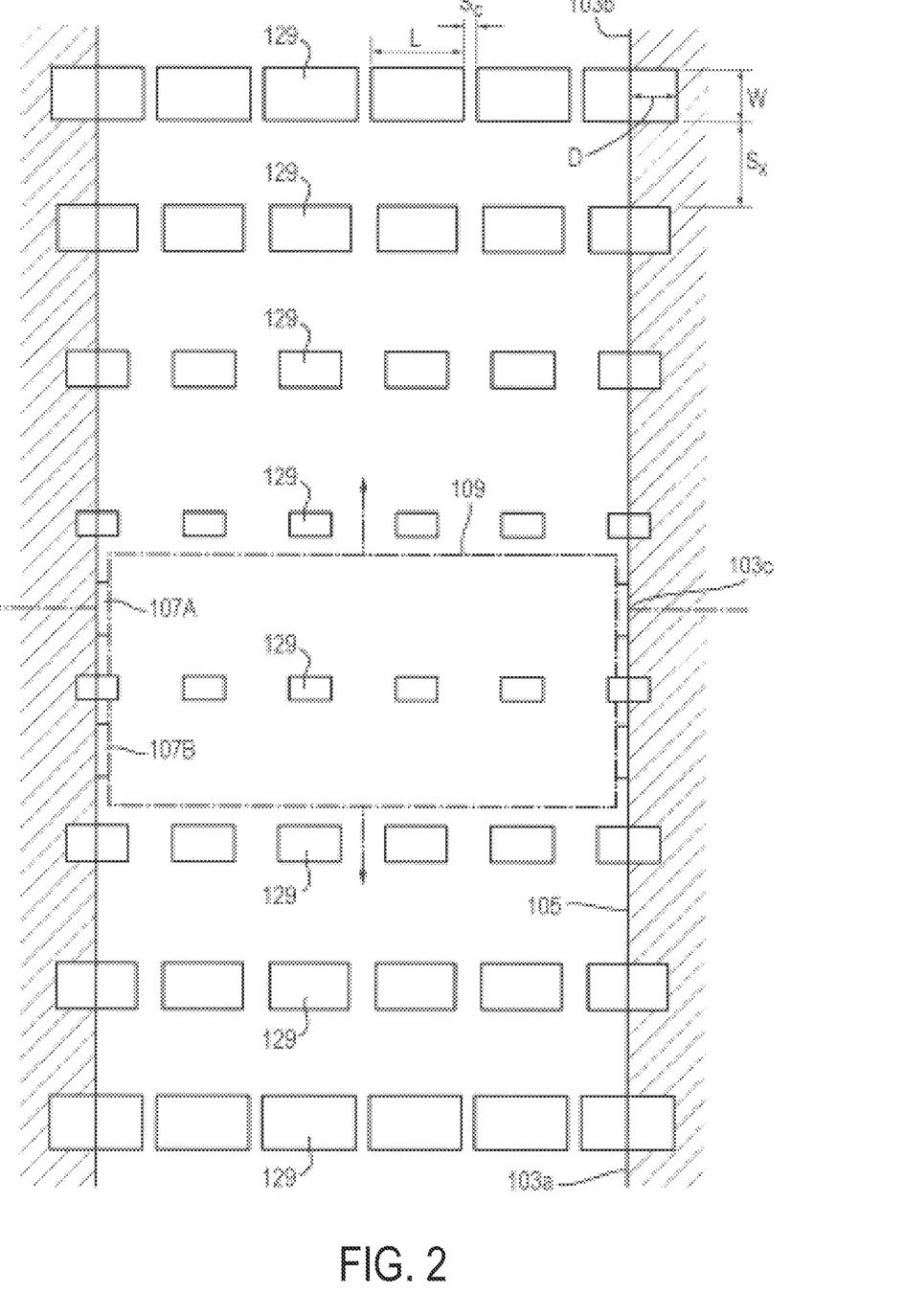
FIG. 2 is a schematic cross-sectional view through a cylinder according to a previous example of a bore for receiving a reciprocating piston.

The following description relates to systems and methods for a bore portion for receiving a reciprocating piston. Textured features of a cylinder liner of a bore portion of an engine may be varied via one or more of their depth, breadth, and spacing depending on where the features are located with respect to a piston stroke. These geometric parameters are illustrated in FIG. 1. A previous example of a combustion chamber comprising surface features and a piston arranged to oscillate therein is illustrated in FIG. 2. In the previous example, surface textures where piston speeds are higher increase friction and therefore increase emissions.

Figure 3A:
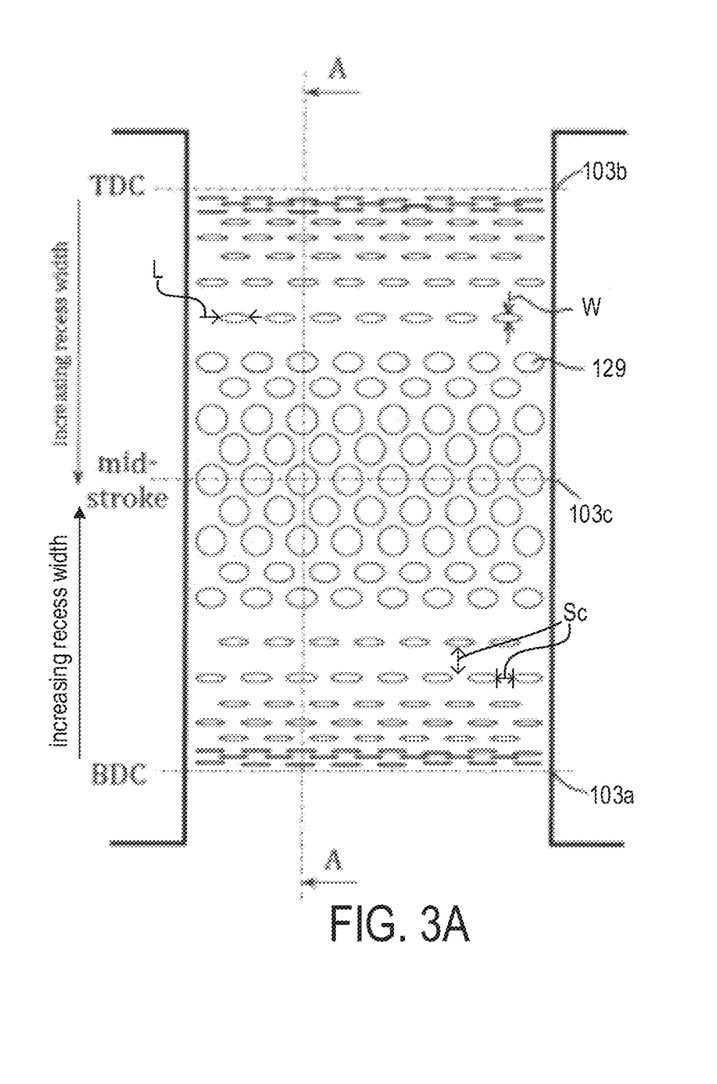
FIG. 3A is a schematic view of a bore portion according to an arrangement of the present disclosure.
Figure 3B:
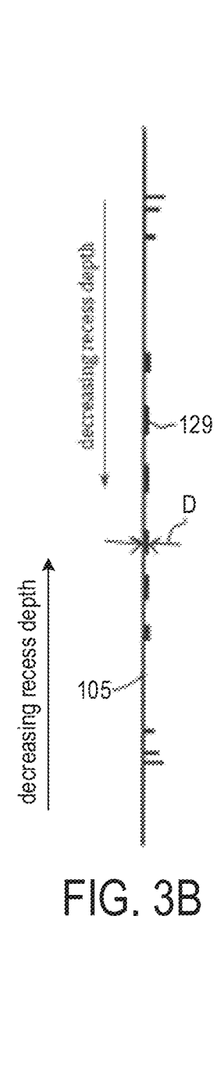
FIG. 3B is a partial sectional view corresponding to section A-A defined in FIG. 3A showing the variation of the recess depth along the axial length of the bore portion.
Figure 4A:
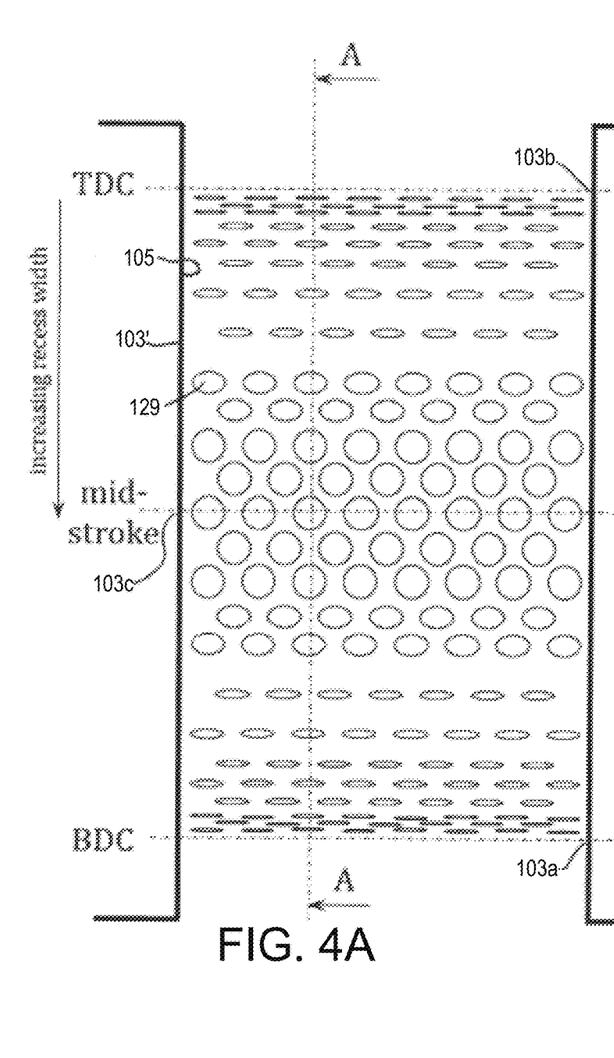
FIG. 4A is a schematic view of a bore portion according to an arrangement of the present disclosure.
Figure 4B:
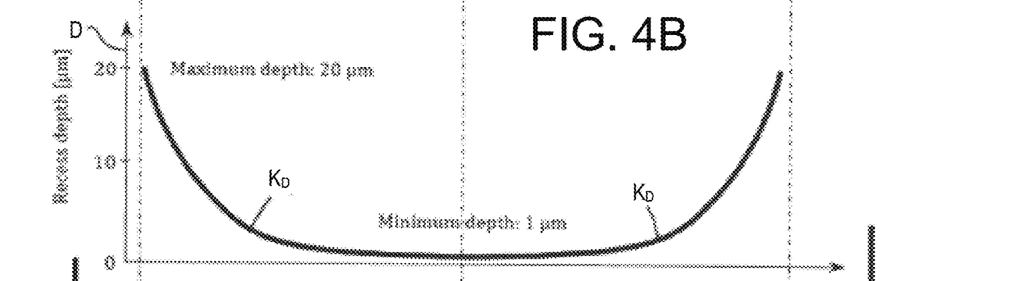
FIGS. 4B and 4C are graphs showing the variation of the recess depth and recess width along the axial length of the bore portion relative to the schematic view of FIG. 4A.
Figure 4C:
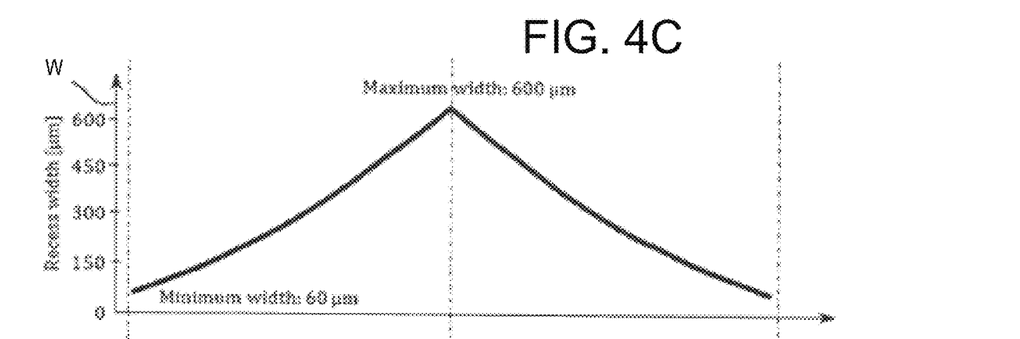
Figure 5A:
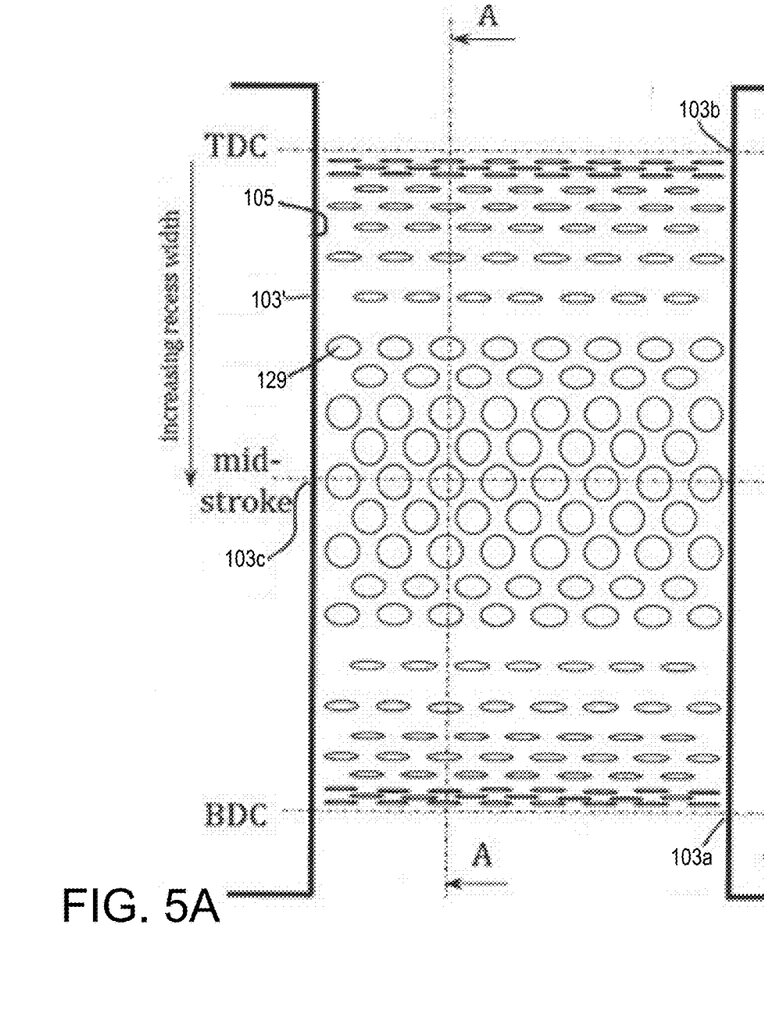
FIG. 5A is a schematic view of a bore portion according to an arrangement of the present disclosure.
Figure 5B:
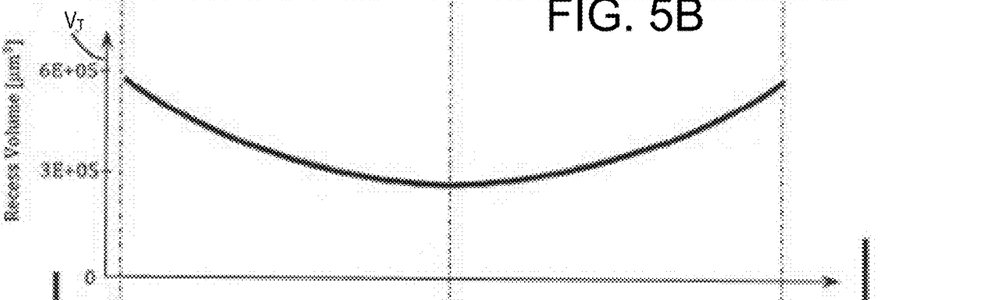
FIGS. 5B and 5C are graphs showing the variation of the recess volume and recess axial spacing along the axial length of the bore portion relative to the schematic view of FIG. 5A.
Figure 5C:
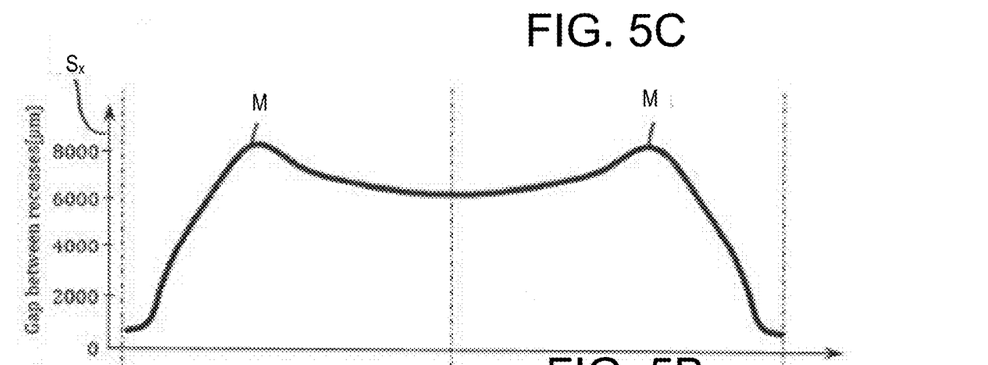
Figure 6A:
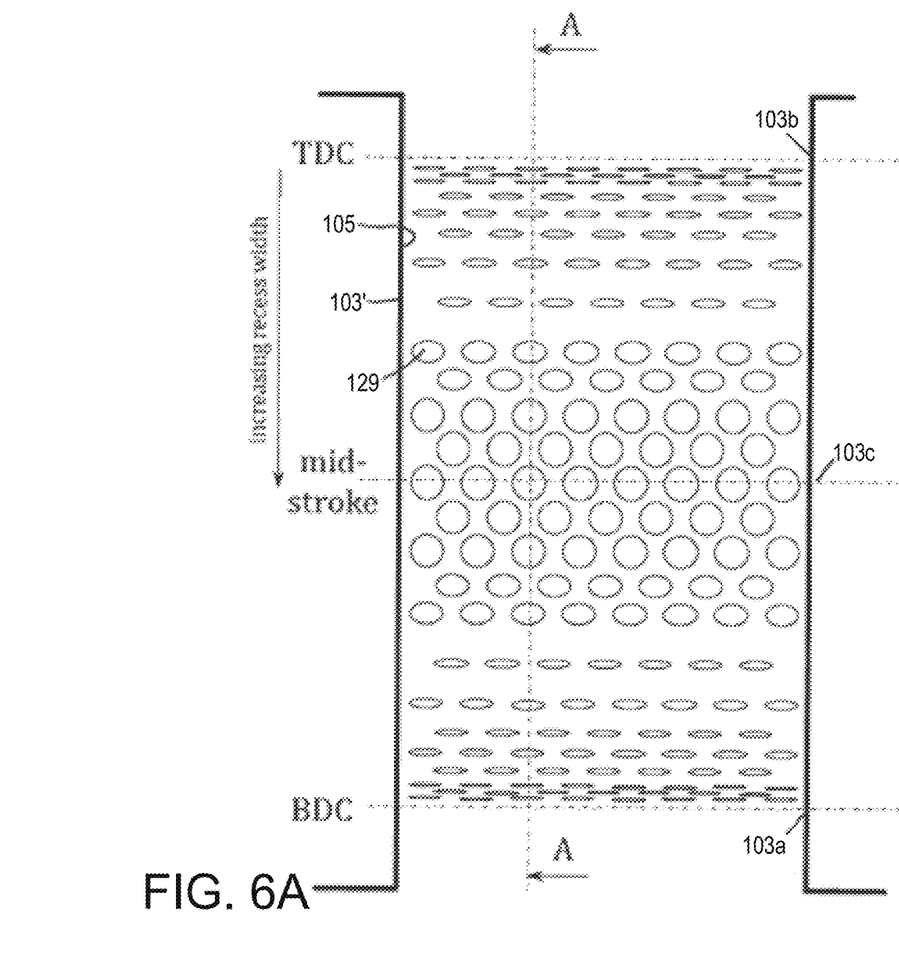
FIG. 6A is a schematic view of a bore portion according to an arrangement of the present disclosure.
Figure 6B:
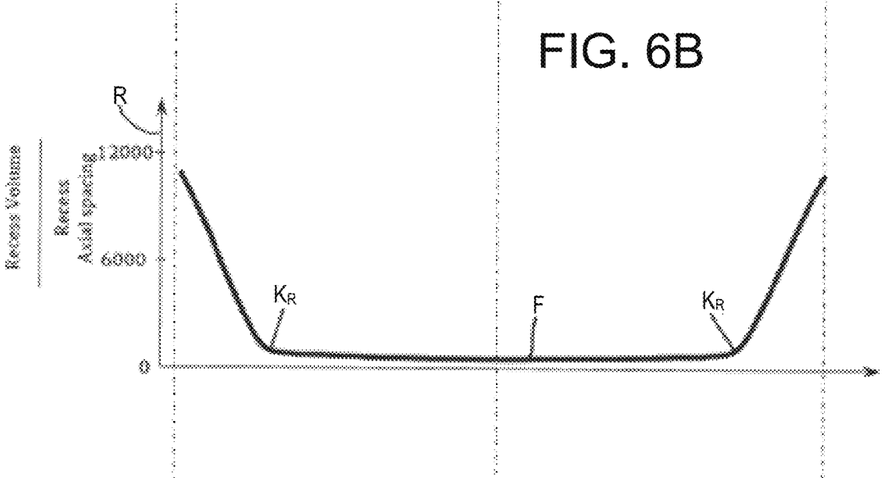
FIG. 6B is a graph showing the variation of the recess volume to spacing ratio along the axial length of the bore portion relative to the schematic view of FIG. 6A.
Figure 7A:
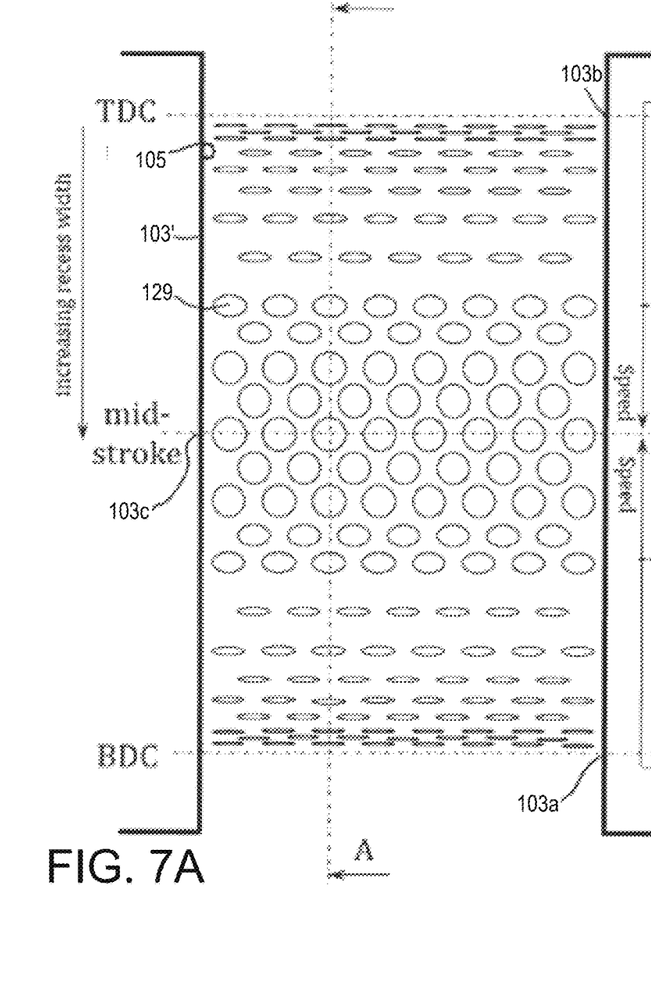
FIG. 7A is a schematic view of a bore portion according to an arrangement of the present disclosure.
Figure 7B:
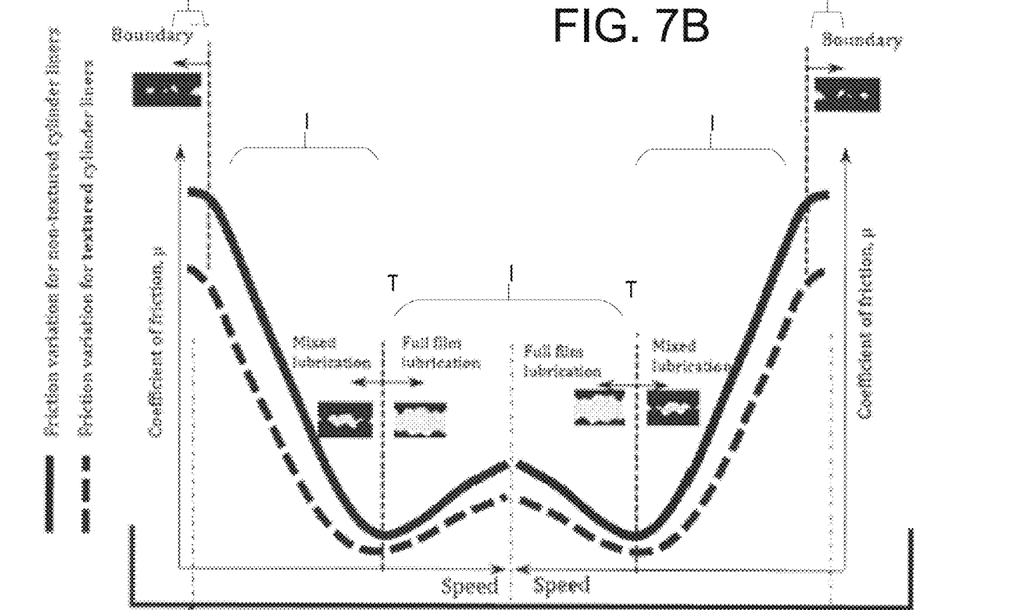
FIG. 7B is a corresponding graph showing the coefficient of friction along the axial length of the bore portion with the textured surface according to the arrangement of the present disclosure illustrated in FIG. 7A compared to cylinders without a progressively textured surface.
Figure 8:
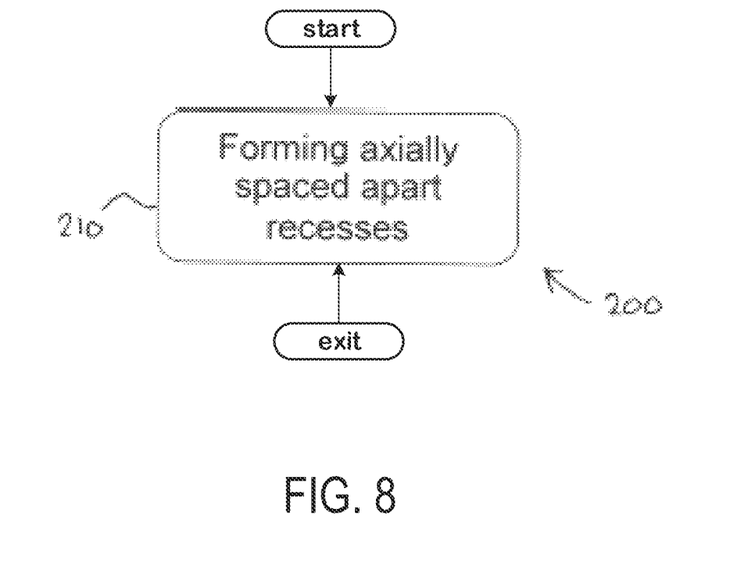
FIG. 8 depicts a method according to the present disclosure.

By varying surface texture shapes and dispersion within the liner based on the piston stroke, friction may be minimized throughout the piston stroke. FIG. 3A is a schematic view of a bore portion according to an arrangement of the present disclosure. FIG. 3B is a partial sectional view corresponding to section A-A defined in FIG. 3A showing the variation of the recess depth along the axial length of the bore portion. FIG. 4A is a schematic view of a bore portion according to an arrangement of the present disclosure. FIGS. 4B and 4C are graphs showing the variation of the recess depth and recess width along the axial length of the bore portion relative to the schematic view of FIG. 4A. FIG. 5A is a schematic view of a bore portion according to an arrangement of the present disclosure. FIGS. 5B and 5C are graphs showing the variation of the recess volume and recess axial spacing along the axial length of the bore portion relative to the schematic view of FIG. 5A. FIG. 6A is a schematic view of a bore portion according to an arrangement of the present disclosure. FIG. 6B is a graph showing the variation of the recess volume to spacing ratio along the axial length of the bore portion relative to the schematic view of FIG. 6A. FIG. 7A is a schematic view of a bore portion according to an arrangement of the present disclosure. FIG. 7B is a corresponding graph showing the coefficient of friction along the axial length of the bore portion with the textured surface according to the arrangement of the present disclosure illustrated in FIG. 7A compared to cylinders without a progressively textured surface. FIG. 8 depicts a method according to the present disclosure.

In one example, the embodiments of FIGS. 3A through 7B illustrate arrangements for increasing an effectiveness of surface features of a cylinder liner to decrease friction experienced by the piston. This may be executed via adjusting the depth, breadth, and spacing depending on where recesses, or other features are arranged along a piston stroke. In one example, recesses nearest top-dead center and bottom-dead center positions may be deeper, while the depth may be reduced toward a mid-stroke position where piston speeds are highest. In one embodiment, additionally or alternatively, the recesses nearest top-dead center and bottom-dead center positions may be wider, while the width may be reduced at the mid-stroke position. In a further embodiment, additionally or alternatively, the recesses nearest top-dead center and bottom-dead center positions may be arranged more closely to one another, while spaces between the recesses may be increases at the mid-stroke. In one example, the variation in the above described parameters may be calculated from an average sliding speed of the piston at distinct axial positions.

In one example, the volume of the recesses may be increased from the mid-stroke to the top-dead center position and to the bottom-dead center position such that the recesses at the top-dead center and bottom-dead center positions comprise a greater volume than recesses at the mid-stroke. By doing this, machining costs may be reduced as one larger recess may replace two or more smaller recesses totaling an equal volume.

The bore portion may comprise first and second ends between which the piston travels in an axial direction. The bore portion may comprise a plurality of axially spaced apart recesses formed in a piston facing surface of the bore portion at a plurality of axial positions, with at least one recess being provided at each axial position.

Each recess may comprise a width in the axial direction of the bore portion and each recess may comprise a depth perpendicular to the piston facing surface, wherein the widths of the recesses reduce in the axial direction away from a mid-stroke position between the first and second ends and the depths of the recesses increase in the axial direction away from the mid-stroke position.

The at least one recess at each axial position may define a total recess volume at each axial position. The total recess volume at each axial position may vary progressively along the axial length of the bore portion, with the total recess volume at each axial position increasing away from a mid-stroke position and towards the first and second ends of the bore portion.

The mid-stroke position may correspond to a point at which the velocity of the piston is a maximum velocity. The mid-stroke position may correspond to the position of a piston ring when the velocity of the piston is maximum. Accordingly, the mid-stroke position may not be exactly midway between the first and second ends of the bore portion, although the mid-stroke position may be closer to an exact midway point than either of the first and second ends. The velocity of the piston may be zero at the first and second ends of the bore portion. For example, the first and second ends of the bore portion may be defined by the extent of travel of the piston ring.

The recesses may be distributed in the axial direction. The recesses may also be distributed in a circumferential direction of the bore portion if there is more than one recess at each axial position.

There may be a transition region between the mid-stroke position and each of the first and second ends. Ends of the transition region may be spaced apart from the mid-stroke position and each of the first and second ends. The transition region may extend lengthwise over a portion of the bore portion or it may be a point along the length of the bore portion A full film lubrication zone may be defined between the transition regions either side of the mid-stroke position. A full film lubrication regime may occur between the piston and the bore portion in the full film lubrication zone.

An internal combustion engine, reciprocating machine or cylinder liner may comprise the aforementioned bore portion. For example, the cylinder may be provided in a reciprocating engine, such as an internal combustion engine, a reciprocating pump or any other machine with a piston that slidably reciprocates in a bore portion of the machine. The bore portion may be part of a cylinder for receiving the piston.

According to another aspect of the present disclosure, there is provided a method of manufacturing a bore portion for receiving a reciprocating piston. The bore portion may comprise first and second ends between which the piston travels (e.g., oscillates and/or reciprocates) in an axial direction, wherein the method comprises forming a plurality of axially spaced apart recesses in a piston facing surface of the bore portion at a plurality of axial position, with at least one recess being provided at each axial position. Each recess may comprise a width in the axial direction of the bore portion and each recess may comprise a depth perpendicular to the piston facing surface. The widths of the recesses reduce in the axial direction away from a mid-stroke position between the first and second ends and the depths of the recesses increase in the axial direction away from the mid-stroke position.

The at least one recess at each axial position may define a total recess volume at each axial position. The total recess volume at each axial position may vary progressively along the axial length of the bore portion, (e.g., with the total recess volume at each axial position increasing away from a mid-stroke position and towards the first and second ends of the bore portion).

A mixed film lubrication zone may be defined between each of the first and second ends and the corresponding transition region. A mixed film lubrication regime may occur between the piston and the bore portion in the mixed film lubrication zones.

A boundary lubrication zone may be defined at each of the first and second ends. A boundary lubrication regime may occur between the piston and the bore portion in the boundary lubrication zones. The boundary lubrication zones may extend from each of the first and second ends to the adjacent mixed film lubrication zone.

Recesses may be absent at the first and second ends of the bore portion where the piston changes direction. For example, no recesses may be provided at the extreme axial locations at which the piston ring of the piston changes direction.

An axial spacing between neighboring axial positions may vary progressively along the axial length of the bore portion. The axial spacing between neighboring axial positions may increase when moving away from the mid-stroke position to a maximum value at the transition region between the mid-stroke position and each of the first and second ends. The axial spacing between neighboring axial positions may increase when moving away from each of the first and second ends to the maximum value at the corresponding transition region between the mid-stroke position and the corresponding first and second ends. The axial spacing between neighboring axial positions may increase at a greater rate when moving away from either of the first and second ends than when moving away from the mid-stroke position.

There may be a step change in the rate at which the depth of the recesses changes. That is to say, the rate at which the depth of the recesses changes may not be fixed.

A recess volume-to-spacing ratio may be defined by a ratio of the total recess volume at a particular axial position to an axial spacing between the at least one recess at the particular axial position and a neighboring at least one recess. The recess volume-to-spacing ratio may vary progressively along the axial length of the bore portion. The recess volume-to-spacing ratio may increase away from the mid-stroke position and towards the first and second ends of the bore portion. There may be a step change in the rate at which the recess volume-to-spacing ratio of the recesses changes (e.g. at or in the transition region).

The widths of the recesses may vary in the axial direction to at least partially contribute to the progressive variation of the recess volume and/or recess volume-to-spacing ratio, in one example. The depths of the recesses may vary in the axial direction to at least partially contribute to the progressive variation of the recess volume and/or recess volume-to-spacing ratio, in one example. The axial spacing between neighboring recesses may vary in the axial direction to at least partially contribute to the progressive variation of the recess volume-to-spacing ratio, in one example.

The recess volume-to-spacing ratio at the particular axial position may be dependent on (e.g. a function of) a piston-velocity ratio at the particular axial position. The piston velocity ratio may be a ratio of the piston velocity at the particular axial position to the maximum velocity of the piston during that particular piston stroke in a steady state (e.g. with a constant crankshaft velocity). By way of example, the recess volume-to-spacing ratio at the particular axial position may be a function of the reciprocal of (e.g. inversely proportional to) the piston velocity ratio at the particular axial position.

The progressive variation of a parameter may comprise a plurality of changes to the parameter (e.g. with a plurality of changes in each direction away from the mid-stroke position). The progressive variation of a parameter may be centered on the travel of a piston ring of the piston.

Each recess may have a length in a direction with a circumferential component. For example, the lengths of the recesses may be orientated in a direction perpendicular to the axial direction of the cylinder (e.g. in the circumferential direction) or inclined relative to the axial and circumferential directions. The lengths of the recesses may be substantially constant across the axial positions. Alternatively, the lengths of the recesses may vary in the axial direction (e.g. to at least partially contribute to the progressive variation of the recess volume and/or recess volume-to-spacing ratio).

A plurality of circumferentially spaced apart recesses may be provided at each of the axial positions. A circumferential spacing between neighboring recesses may be constant. Alternatively, the circumferential spacing between neighboring recesses may vary in the axial direction (e.g. to at least partially contribute to the progressive variation of the recess volume and/or recess volume-to-spacing ratio).

An assembly may comprise the aforementioned bore portion and the piston. The piston may comprise a piston ring. The recesses between the transition regions either side of the mid-stroke position may have widths greater than a corresponding dimension (e.g. axial thickness) of the piston ring.

An internal combustion engine, reciprocating machine or cylinder liner may comprise the aforementioned bore portion. For example, the cylinder may be provided in a reciprocating engine (such as an internal combustion engine), a reciprocating pump or any other machine with a piston that slidably reciprocates in a bore portion of the machine. The bore portion may be part of a cylinder for receiving the piston.

According to another aspect of the present disclosure, there is provided a method of manufacturing a bore portion for receiving a reciprocating piston. The bore portion may comprise first and second ends between which the piston travels in an axial direction. The method may include forming a plurality of axially spaced apart recesses in a piston facing surface of the bore portion at a plurality of axial positions, with at least one recess being provided at each axial position. Each recess comprises a width in the axial direction of the bore portion and each recess comprises a depth perpendicular to the piston facing surface. The widths of the recesses may reduce in the axial direction away from a mid-stroke position between the first and second ends and the depths of the recesses may increase in the axial direction away from the mid-stroke position.

The at least one recess at each axial position may define a total recess volume at each axial position. The total recess volume at each axial position may vary progressively along the axial length of the bore portion. For example, the total recess volume at each axial position increases away from a mid-stroke position and towards the first and second ends of the bore portion.

According to another aspect of the present disclosure, there is provided a cylinder for receiving a reciprocating piston, the cylinder defining a bore portion having first and second ends between which the piston travels in an axial direction. The bore portion comprises a plurality of axially spaced apart recesses formed in a piston facing surface of the bore portion at a plurality of axial positions, with at least one recess being provided at each axial position. The at least one recess at each axial position defines a total recess volume at each axial position. A recess volume-to-spacing ratio is defined by a ratio of the total recess volume at a particular axial position to an axial spacing between the at least one recess at the particular axial position and a neighboring at least one recess. The recess volume-to-spacing ratio varies progressively along the axial length of the bore portion.

FIGS. 1, 3A, 4A, 5A, 6A, and 7A show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a simplified cross-section of an engine 101. The engine comprises pistons 109, which reciprocate in cylinders 103 and drive rotation of a crankshaft 110 via piston rods 112. The depicted engine 101 is a four-cylinder engine having an overhead camshaft. However, the engine 101 may be any type of engine, for example a single overhead camshaft (SOHC) engine, a double overhead camshaft (DOHC) engine, an overhead valve (OHV) engine, or other appropriate type of engine. Furthermore, whilst the engine 101 shown in FIG. 1 is a four-cylinder engine, the engine 101 may comprise any appropriate number of cylinders 103, for example the engine 101 may be a three-cylinder engine, a six-cylinder engine, an eight-cylinder engine or any other number of cylinders. The cylinders 103 may be arranged in any appropriate configuration, such as in-line, horizontally opposed, or V-form.

Each of the cylinders 103 defines a bore portion 103' having first and second ends 103a, 103b between which the piston 109 travels in an axial direction. The piston 109 may change direction at the first and second ends 103a, 103b. In particular, each of the cylinders 103 comprises an inner bore surface 105 configured to engage piston rings 107 of the engine piston 109. The inner bore surface 105 may be an inner surface of a cylinder bore formed directly into a cylinder block of the engine 101, as shown in FIG. 1. Alternatively, the inner bore surface 105 may be an inner surface of a cylinder liner that is assembled into the cylinder block.

During operation of the engine 101, each of the pistons 109 reciprocates within the cylinder 103 between a top dead center (TDC) position and a bottom dead center (BDC) position. In the context of the present disclosure, the term "top dead center" refers to the furthest point of a piston's (e.g. piston ring's) travel, at which it changes from an upward stroke, away from the crankshaft 110 of the engine 101, to a downward stroke, towards the crankshaft 110 of the engine 101. The term "bottom dead center" refers to the furthest point of a piston's (e.g. piston ring's) travel, at which it changes from a downward to an upward stroke. In a similar manner, the term "top" end of the cylinder 103 refers to the second end 103b of the cylinder 103 at which the piston 109 reaches top dead center, and the term "bottom" end of the cylinder 103 refers to the first end 103a of the cylinder 103 at which the piston 109 reaches bottom dead center. In this way, the second end 103b may be further from the crankshaft 110 than the first end 103a.

In the arrangement of the previous example shown in FIG. 2, the piston 109 has a top piston ring 107A and a bottom piston ring 107B. However, the piston 109 may have any appropriate number of piston rings 107, for example the piston 109 depicted in FIG. 1 has a middle piston ring. Each of the piston rings 107 may be configured to perform a different function, for example top piston ring 107A may be a compression ring configured to provide a seal between the top and bottom of the cylinder 103 on either side of the piston 109, and the bottom piston ring 107B may be an oil scraper ring configured to remove oil from the inner surface 105 of the cylinder 103.

In the arrangement of the previous example shown in FIG. 2, the top and bottom piston rings 107A, 107B each comprise a circumferential surface configured to engage the inner surface 105 of the cylinder 103. A contact zone between any one of the piston rings 107 may be defined by the portion of the circumferential surface of the piston ring 107 that engages the inner surface 105 of the cylinder 103.

During the operation of the engine 101, the linear speed of the piston 109 varies between a minimum speed, for example a zero speed when the piston is stationary relative to cylinder 103 at top dead center or bottom dead center, and a maximum speed as the piston 109 moves between top center and bottom dead center. The maximum piston speed occurs at a point 103c between the first and second ends 103a, 103b of the bore portion in the example of FIG. 2. As a result of the change in speed of the piston 109, the coefficient of friction between the piston rings 107 and the inner bore surface 105 of the cylinder varies as the piston 109 travels within the cylinder bore. In one example, the piston is stationary and experiences a zero speed or a minimum speed as it reverses a direction of travel. In one embodiment, the piston experiences the minimum speed at top dead center or bottom dead center.

In order to reduce the friction between the sliding components of the engine 101, such as the piston rings 107 and the inner bore surface 105 of the cylinder, a lubricant may be used. Accordingly, during operation of the engine, a lubricant film may be formed between the circumferential surface of the piston ring 107 and the inner surface 105 of the cylinder 103, for example as a result of the motion between the respective surfaces. The lubricant film may be used to separate the inner surface 105 and the circumferential surface of the piston ring 107 so that there is no or reduced physical contact between the two surfaces.

The frictional coefficient between sliding components may be determined using the Stribeck curve, which is used to categorize the frictional properties between two surfaces as a function of the viscosity of the lubricant and the relative speed between the components per unit load. Friction may be minimized by operating at the minimum point on the Stribeck curve, which defines the tribological transition between hydrodynamic lubrication and mixed lubrication. However, it is difficult to maintain operation at the minimum point on the Stribeck curve across the full piston stroke as a result of the cyclical acceleration and deceleration of the piston 109. For example, it is difficult to maintain hydrodynamic lubrication towards the top and bottom ends of the piston stroke owing to the low relative speeds (e.g., the zero speed) between the piston 109 and the cylinder 103. In particular, at the ends of the travel of the piston 109, where the piston speed drops to zero, a lubricant film between the piston rings 107 and the inner bore surface 105 of the cylinder 103 can collapse as there is no motion to form a hydrodynamic lubricant film. The collapse of the film is dependent on how fast the lubricant can drain away from a contact zone between the piston rings 107 and the inner bore surface 105 of the cylinder 103.

As shown in the example of FIG. 2, the bore portion of the cylinder 103 of the previous example comprises a plurality of discrete recesses 129 indented into the inner surface 105. The recesses 129 may comprise any type of opening or depression in the inner surface 105. The recesses 129 may enable a fluid, such as a lubricant, to be held within the opening as the piston ring 107 moves over the opening. For example, the recesses 129 may comprise a plurality of pockets shaped to retain lubricant, and/or decrease the rate at which lubricant drains away from the contact zones. The pockets may be of any shape, for example the pockets may be square, rectangular, circular, rounded oblongs or any other shape. In one arrangement, the pockets may be of a similar shape to each other. In another arrangement, the plurality of pockets may comprise a number of differently formed/shaped pockets, for example the plurality of pockets may comprise a number of round-bottomed pockets and a number of square-bottomed pockets that are configured to trap lubricant.

As depicted, the recesses 129 are formed at a plurality of axial positions along the length of the bore portion, e.g. forming a plurality of axially separated rows of recesses 129. At least one recess 129 may be provided at each axial position and in the particular arrangement shown, there is a plurality of recesses 129 circumferentially distributed at each axial position.

Each recess 129 has a width W in the axial direction of the cylinder, a depth D perpendicular to the surface 105 and a length L in a direction with a circumferential component. As shown, the lengths L of the recesses may be orientated in a direction perpendicular to the axial direction of the cylinder (e.g. in the circumferential direction), however it is also envisaged that the lengths may be inclined relative to the axial and circumferential directions. Regardless of how the recesses 129 are orientated, the recesses 129 may be elongate with the lengths L being greater than the widths W.

As mentioned above, the recesses 129 are axially distributed along the length of the bore portion. The recesses 129 may thus be spaced apart in an axial direction with an axial spacing, S. The recesses 129 may also be circumferentially distributed about the circumference of the bore portion with a circumferential spacing, $S_c$. The recess dimensions and spacing depicted in the Figures are schematic and may be much smaller or larger than those depicted, in one example.

Each recess 129 has a volume, V, associated with it and is defined by the recess below the bore surface 105. Furthermore, the recesses 129 at each axial position define a total recess volume, $V_T$, for each axial position.

Referring now to FIGS. 3A and 3B, an embodiment of a particular arrangement of recesses of the present disclosure will be described. As depicted in FIG. 3A, the widths, W, of the recesses 129 reduce in either axial direction away from the mid-stroke position 103c between the first and second ends 103a, 103b and, as depicted in FIG. 3B, the depths, D, of the recesses 129 increase in either axial direction away from the mid-stroke position 103c. The widths, W, of the recesses 129 may be less than or equal to their lengths, L. The recesses 129 may be substantially elliptical in shape, although other shapes are also contemplated, such as a rectangle. At the mid-stroke position 103c, the recesses 129 may have a width, W, that corresponds to the length, L, such that the recesses are substantially circular (or square) at this location.

The lengths, L, of the recesses 129 may be substantially constant within and across the axial positions. The circumferential spacing, $S_c$, between neighboring recesses 129 may also be substantially constant within and across the axial positions. In alternative arrangements the lengths, L, and/or circumferential spacing, $S_c$, of the recesses 129 may vary in the axial direction. (It is to be noted that FIGS. 3A, 4A, 5A, 6A, and 7A are schematic in that they depict the surface 105 as if rolled out flat and as such the lengths, L, are depicted as being constant.)

The variation of the recess parameters (e.g. width, depth, length, volume, axial spacing, circumferential spacing or any other parameter) may be based (e.g. centered) on the travel of the piston ring 107 of the piston or, where there is more than one piston ring, a particular one of the piston rings (e.g. piston ring 107A). For example, the location of the first and second ends 103a, 103b of the bore portion may be set by the extent of travel of the piston ring or particular piston ring. Furthermore, the point 103c substantially mid-way between the first and second ends 103a, 103b of the bore portion may be the point at which the axial velocity of the piston ring (or particular piston ring) is highest. The point at which the maximum piston velocity occurs may be close to, although not exactly at, the midpoint between the first and second ends 103a, 103b. The maximum velocity of the piston may occur at a point that is closer to the second end 103b of the bore portion (that is furthest from the crankshaft 110) than the first end 103a (that is closest to the crankshaft 110). As the mid-stroke position 103c may not be exactly central with respect to the first and second ends 103a, 103b, the recess parameters may vary as a function of the axial position that is not symmetrical about the axial location 103c.

As mentioned above, the recesses 129 are axially distributed across the length of the bore portion between the first and second ends 103a, 103b. However, there may be no recesses at the first and second ends 103a, 103b of the bore portion where the piston (e.g. piston ring) changes direction.

FIGS. 4B and 4C show the progressive variation of recess depth D and width W respectively for the bore portion 103' depicted in FIG. 4A. The recess widths W reduce from a maximum at the mid-stroke position 103c to a minimum width at or near the first and second ends 103a, 103b. The rate at which the widths W reduce may decrease when moving away from the mid-stroke position 103c, although the decrease in rate may be small such that the recess widths W may reduce in an approximately linear fashion with respect to their axial position. By contrast, the recess depths D may increase from a minimum value at the mid-stroke position 103c to a maximum depth at or near the first and second ends 103a, 103b. The rate at which the depths D increase may be zero at the mid-stroke position 103c and may increase when moving away from the mid-stroke position 103c. In the example depicted, there may be an approximate step change in the rate at which the depth D of the recesses changes, e.g. such that either side of the mid-stroke position 103c there may be a knee $K_D$ in the curve of recess depth D as a function of axial position.

With reference to FIGS. 5A and 5B, changes to the recess parameters, such as depth D and width W, may cause the total recess volume $V_T$ to change with axial position. Accordingly, the total recess volume $V_T$ at each axial position may vary progressively along the axial length of the bore portion. The decrease in recess width W away from the mid-stroke position 103c described above may tend to reduce the recess total volume $V_T$, whereas the increase in recess depth D may tend to increase the total recess volume $V_T$. However, in the arrangement depicted, the increasing recess depth D away from the mid-stroke position 103c dominates such that the total recess volume $V_T$ at each axial position increases away from the mid-stroke position 103c. The rate of change of the total recess volume $V_T$ may be zero at the mid-stroke position 103c. The rate of change of the total recess volume $V_T$ may increase with distance from the mid-stroke position.

With reference to FIGS. 5A and 5C, the axial spacing $S_x$ between neighboring axial positions may vary progressively along the axial length of the bore portion. In the particular arrangement depicted, the axial spacing $S_x$ between neighboring axial positions may increase when moving away from the mid-stroke position 103c to a maximum value M between the mid-stroke position 103c and each of the first and second ends 103a, 103b. The axial spacing $S_x$ between neighboring axial positions may also increase when moving away from each of the first and second ends 103a, 103b to the maximum value M. The axial spacing $S_x$ between neighboring axial positions may increase at an overall greater rate when moving away from either of the first and second ends 103a, 103b than when moving away from the mid-stroke position 103c.

A recess volume-to-spacing ratio R for recesses at a particular axial position may be defined as a ratio of the total recess volume $V_T$ at that particular axial position to the axial spacing $S_x$ between the particular axial position and a neighbouring axial position with one or more recesses. The recess volume-to-spacing ratio R is thus a function of the axial position, x, as given below via function 1:

$R(x)=V_T(x)/S_x(x)$. Function 1

When determining the recess volume-to-spacing ratio R, the axial spacing $S_x$ for a particular axial position may be measured using the neighboring axial position consistently in the same direction (e.g. in a first axial direction) or a direction away from the point 103c substantially mid-way between the first and second ends 103a, 103b of the bore portion.

With reference to FIGS. 6A and 6B, the recess volume-to-spacing ratio R may vary progressively across the length of the bore portion, in particular the recess volume-to-spacing ratio R may increase away from the mid-stroke position 103c and towards the first and second ends 103a, 103b of the bore portion. The minimum value of the recess volume-to-spacing ratio R may occur at the mid-stroke position 103c. The recess volume-to-spacing ratio R may thus be centered on the mid-stroke position 103c. The rate at which the recess volume-to-spacing ratio R increases may be zero at the mid-stroke position 103c and may increase when moving away from the mid-stroke position 103c. The rate of increase in the recess volume-to-spacing ratio R when moving away from the mid-stroke position 103c may initially be gradual or indeed zero such that there may be a substantially flat region F in the recess volume-to-spacing ratio R profile. In the example depicted, there may be an approximate step change in the rate at which the recess volume-to-spacing ratio R of the recesses changes, e.g. such that either side of the mid-stroke position 103c there may be a knee $K_R$ in the curve of recess volume-to-spacing ratio R as a function of axial position.

The variation in the recess volume-to-spacing ratio R may be achieved by changing one or more of the widths W, depths D, lengths L, axial spacing $S_x$ and circumferential spacing $S_c$ of the recesses 129 in the axial direction. In the particular example shown, the widths W, depths D, and axial spacing $S_x$ of the recesses 129 vary. However, it is equally envisaged that other parameters such as recess length L and circumferential spacing $S_c$ may also vary and that one or subset of the recess parameters may vary to achieve the desired variation in the recess volume-to-spacing ratio R.

As for the recess total volume $V_T$, the recess width W and recess depth D may vary in opposite senses with the variation of recess depth D dominating the recess width W such that the volume-to-spacing ratio R increases away from the mid-stroke position 103c. The initial increase in the axial spacing $S_x$ away from the mid-stroke position 103c (to the maximum M) is also dominated by the variation of recess depth D such that the volume-to-spacing ratio R increases away from the mid-stroke position 103c (the initial increase in axial spacing $S_x$ would otherwise tend to reduce the volume-to-spacing ratio R).

The recess volume-to-spacing ratio R may be a function of a piston-velocity ratio P at the same axial position. The piston velocity ratio P at a particular axial location may be a ratio of the piston velocity magnitude $V_P$ at the particular axial position to the maximum velocity magnitude of the piston $V_{P,max}$ during that particular piston stroke in a steady state in which the crankshaft rotational speed Ω is constant. The piston velocity ratio P thus varies with axial position x and is independent of the crankshaft speed Ω. Accordingly, $P(x)=V_p(x,\Omega)/V_{P,max}(\Omega)$  Function 2; and $R(x)=f(P(x))$  Function 3

It will be appreciated that the piston velocity ratio P will vary between 0 and 1 with the ratio P being zero at the first and second ends 103a, 103b of the bore portion and 1 at the maximum velocity point 103c. By way of example, the recess volume-to-spacing ratio R may be a function of the reciprocal of the piston velocity ratio P, e.g. R may be inversely proportional to P. However, the recess volume-to-spacing ratio R may vary with any function in which R reduces as the piston moves away from the first and second ends 103a, 103b of the piston's travel.

References to a "progressive" variation of a particular recess parameter may be defined as there being a plurality of changes to the particular recess parameter moving along the length of the bore portion. For example, there may be a plurality of changes to the recess parameter in each direction away from the mid-stroke position 103c. The variation of a particular recess parameter may also be approximately symmetrical about the mid-stroke position 103c. However, as the mid-stroke position 103c may not be exactly central with respect to the first and second ends 103a, 103b, the recess parameters may vary as a function of the axial position that is not exactly symmetrical about the mid-stroke position 103c.

With reference to FIGS. 7A and 7B, the lubrication regimes between the piston 109 (in particular the piston ring 107) and the bore portion surface 105 will now be described. In a central region C substantially centered on the mid-stroke position 103c the components may slide with respect to one another under a full film lubrication regime. There may be a transition point or region T either side of the mid-stroke position 103c. The transition T may extend lengthwise over a portion of the bore portion or it may be a point along the length of the bore portion. In intermediate regions I either side of transitions T and away from the central region C, the components may slide with respect to one another under a mixed film lubrication regime. In outer regions O at the first and second ends 103a, 103b and either side of the intermediate regions I, the components may slide with respect to one another under a boundary lubrication regime.

The approximate step change in the rate at which the depth D of the recesses changes may occur at or approximately at transition T. For example, the knee $K_D$ in the depth profile may be positioned at approximately transition T where it is anticipated that the lubrication will switch between full film and mixed lubrication. Likewise, the maximum M in the axial spacing $S_x$ profile and/or the knee $K_R$ in the recess volume-to-spacing ratio profile may be positioned at or approximately at transition T. Changing the rate at which recess parameters change at the transition T may help to better tailor the recesses to suit the particular lubrication regime.

In the central region the recesses 129 may have widths W greater than a corresponding dimension (e.g. axial thickness) of the piston ring 107. Containment of the lubricant in the pockets may be less important in the central region C where there is full film lubrication. Having recesses in and throughout the central region C together with the widths W that are greater than the corresponding dimension (e.g. axial thickness) of the piston ring 107 helps to reduce the interface area between the piston ring 107 and bore portion surface 105. This in turn helps to reduce the friction between the components in the central region C. Also, having a maximum M in the axial spacing profile away from the mid-stroke position 103c results in an increased density of recesses in the central region C which in turn helps to reduce friction in this region.

By contrast, in the intermediate regions I and/or outer regions O it may be desirable for lubricant to be restricted from leaking out of a particular recess as the piston ring 107 travels over it. This may minimize friction between the components under the mixed and boundary lubrication regimes. This may be achieved by having recesses in the intermediate regions I and/or outer regions O with widths W smaller than the corresponding dimension (e.g. axial thickness) of the piston ring 107. It may also be desirable to have deeper recesses 129 in the intermediate regions I and/or outer regions O as deeper recesses may hold more lubricant, which may help to support the lubricant film and in turn reduce friction between the components.

FIG. 7B depicts the overall effect on the coefficient of friction μ for the arrangement disclosed herein as compared to a non-textured bore portion. As is shown, the coefficient of friction μ for the textured bore portion is reduced compared to the non-textured bore portion. The reduction in friction applies in each of the regions of the bore portion.

With reference to FIG. 8, a method 200 of manufacturing the bore portion may comprise a first step 210 of forming the plurality of recesses 129 in the piston facing surface 105 of the bore portion 103' at a plurality of axial positions, with at least one recess being provided at each axial position. The recesses 129 may be formed by casting, machining, laser honing and/or any other forming technique.

Although the cylinder 103 has been described above with reference to an internal combustion engine, the cylinder 103 may also be provided in a reciprocating machine. For example, the cylinder may be provided in a reciprocating engine, a reciprocating pump or any other machine with a piston that slidably reciprocates in a bore portion or cylinder of the machine.

It will be appreciated by those skilled in the art that although the invention has been described by way of example, with reference to one or more examples, it is not limited to the disclosed examples and alternative examples may be constructed without departing from the scope of the invention as defined by the appended claims.

In this way, frictional losses experienced due to inefficient lubrication of the piston may be mitigated via a surface texture applied to a cylinder liner surface. The effectiveness of the textured features (e.g., pockets) may include varying their depth, breadth, and spacing depending on where they are located along a stroke of the piston. For example, the pockets increase in depth toward top-dead center and bottom-dead center positions relative to a mid-way position, wherein the pockets are shallowest at the mid-way position. Additionally or alternatively, in one example, the pockets may increase in width toward the top-dead center and bottom-dead center positions from to the mid-way position, wherein the pockets are narrowest at the mid-way position. In one embodiment, additionally or alternatively, a space and/or a gap between the pockets may decrease toward the top-dead and bottom-dead center positions from the mid-way position, wherein the pockets may be furthest apart at the mid-way position. The technical effect of varying the texture parameters of the surface texture applied to the cylinder liner surface along the piston stroke reduces friction in piston-liner type contacts.

In another representation, the bore portion is included in an engine of a hybrid vehicle.

In one embodiment, a bore portion for receiving a reciprocating piston, the bore portion having first and second ends between which the piston travels in an axial direction, wherein the bore portion comprises a plurality of axially spaced apart recesses formed in a piston facing surface of the bore portion at a plurality of axial positions, with at least one recess being provided at each axial position, wherein each recess has a width in the axial direction of the bore portion and each recess has a depth perpendicular to the piston facing surface, and wherein the widths of the recesses reduce in the axial direction away from a mid-stroke position between the first and second ends and the depths of the recesses increase in the axial direction away from the mid-stroke position.

A first example of the bore portion further comprises where the at least one recess at each axial position defines a total recess volume at each axial position and the total recess volume at each axial position varies progressively along the axial length of the bore portion with the total recess volume at each axial position increasing away from a mid-stroke position and towards the first and second ends of the bore portion.

A second example of the bore portion, optionally including the first example, further includes where there is a transition point or region between the mid-stroke position and each of the first and second ends.

A third example of the bore portion, optionally including one or more of the previous examples, further includes where a full film lubrication zone is defined between the transitions either side of the mid-stroke position, and wherein a full film lubrication regime occurs between the piston and the bore portion in the full film lubrication zone.

A fourth example of the bore portion, optionally including one or more of the previous examples, further includes where a mixed film lubrication zone is defined between each of the first and second ends and the corresponding transition, and wherein a mixed film lubrication regime occurs between the piston and the bore portion in the mixed film lubrication zones.

A fifth example of the bore portion, optionally including one or more of the previous examples, further includes where a boundary lubrication zone is defined at each of the first and second ends, and wherein a boundary lubrication regime occurs between the piston and the bore portion in the boundary lubrication zones.

A sixth example of the bore portion, optionally including one or more of the previous examples, further includes where an axial spacing between neighboring axial positions varies progressively along the axial length of the bore portion.

A seventh example of the bore portion, optionally including one or more of the previous examples, further includes where the axial spacing between neighboring axial positions increases when moving away from the mid-stroke position to a maximum value at the transition between the mid-stroke position and each of the first and second ends.

An eighth example of the bore portion, optionally including one or more of the previous examples, further includes where the axial spacing between neighboring axial positions increases when moving away from each of the first and second ends to the maximum value at the corresponding transition between the mid-stroke position and the corresponding first and second ends.

A ninth example of the bore portion, optionally including one or more of the previous examples, further includes where the axial spacing between neighboring axial positions increases at a greater rate when moving away from either of the first and second ends than when moving away from the mid-stroke position.

A tenth example of the bore portion, optionally including one or more of the previous examples, further includes where there is a step change at the transition in the rate at which the depth of the recesses changes.

An eleventh example of the bore portion, optionally including one or more of the previous examples, further includes where a recess volume-to-spacing ratio is defined by a ratio of the total recess volume at a particular axial position to an axial spacing between the at least one recess at the particular axial position and a neighboring at least one recess, and wherein the recess volume-to-spacing ratio varies progressively along the axial length of the bore portion.

A twelfth example of the bore portion, optionally including one or more of the previous examples, further includes where the recess volume-to-spacing ratio increases away from the mid-stroke position and towards the first and second ends of the bore portion.

A thirteenth example of the bore portion, optionally including one or more of the previous examples, further includes where each recess has a length in a direction with a circumferential component, and the lengths of the recesses are substantially constant across the axial positions.

A fourteenth example of the bore portion, optionally including one or more of the previous examples, further includes where each recess has a length in a direction with a circumferential component, and the lengths of the recesses vary across the axial positions.

A fifteenth example of the bore portion, optionally including one or more of the previous examples, further includes where the piston comprises a piston ring and the recesses between the transitions either side of the mid-stroke position have widths greater than a corresponding dimension of the piston ring.

An embodiment of an engine system, comprises a plurality of pistons positioned to oscillate within a plurality of combustion chambers, wherein each piston comprises one or more piston rings and wherein each combustion chamber comprises a liner comprising a plurality of recesses, wherein a volume of the plurality of recesses increases toward a top-dead center position and a bottom-dead center position from a mid-stroke position of a piston.

A first example of the engine system further comprises where a maximum speed of the piston occurs at the mid-stroke position.

A second example of the engine system, optionally including the first example, further includes where the volume of the plurality of recesses is lowest at the mid-stroke and highest at the top-dead center position and the bottom-dead center position.

A third example of the engine system, optionally including one or more of the previous examples, further includes where a first spacing between recesses decreases from the mid-stroke toward the top-dead center position and the bottom-dead center position, the first spacing measured along a circumference of the liner.

A fourth example of the engine system, optionally including one or more of the previous examples, further includes where a second spacing between recesses increases from the top-dead center position to a first transition position at a higher rate than a rate of increase of the second spacing between the first transition position to the mid-stroke position, wherein the first transition position is between the top-dead center position and the mid-stroke, and wherein the second spacing is a distance between recesses of the plurality of recesses at different axial positions measured relative to an axial axis along which the piston reciprocates, and wherein the second spacing between recesses increases from the bottom-dead center position to a second transition position at a higher rate than a rate of increase of the second spacing between the second transition position to the mid-stroke position.

A fifth example of the engine system, optionally including one or more of the previous examples, further includes where a width of the plurality of recesses is highest at the mid-stroke and lowest at the top-dead center and bottom-dead center positions, wherein the width is measured along an axial axis about which the piston reciprocates.

A sixth example of the engine system, optionally including one or more of the previous examples, further includes where the width at the mid-stroke is higher than a width of a piston ring of the piston.

A seventh example of the engine system, optionally including one or more of the previous examples, further includes where a length of the plurality of recesses is fixed, wherein the length is measured along a circumference of the piston, and wherein the length and the width are equal at the mid-stroke.

An eighth example of the engine system, optionally including one or more of the previous examples, further includes where a depth of the plurality of recesses increases from the mid-stroke position to each of the top-dead center and the bottom-dead center positions, and where in a number of the plurality of recesses decreases from the mid-stroke position to each of the top-dead center and bottom-dead center positions.

An embodiment of a method of manufacturing a bore portion for receiving a reciprocating piston, the bore portion having first and second ends between which the piston travels in an axial direction, wherein the method comprises shaping a plurality of axially spaced apart recesses in a piston facing surface of the bore portion at a plurality of axial positions, wherein each recess has a width in the axial direction of the bore portion and each recess has a depth perpendicular to the piston facing surface, and wherein the widths of the recesses reduce in the axial direction away from a mid-stroke position between the first and second ends and the depths of the recesses increase in the axial direction away from the mid-stroke position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a bore portion for receiving a reciprocating piston, the bore portion having first and second ends between which the piston travels in an axial direction,
wherein the bore portion comprises a plurality of recesses, axially spaced apart, formed in a piston facing surface of the bore portion at a plurality of axial positions, with at least one recess being provided at each axial position, and
wherein widths of the plurality of recesses decrease in the axial direction away from a mid-stroke position toward the first and second ends, and wherein depths of the plurality of recesses increase in the axial direction away from the mid-stroke position toward the first and second ends;

wherein an axial spacing between neighboring axial positions varies progressively along the axial direction of the bore portion from the mid-stroke position to a first end and from the mid-stroke position to a second end; and wherein the axial spacing between neighboring axial positions increases from the mid-stroke position to a maximum value at a first transition point between the mid-stroke position and the first end and a second transition point between the mid-stroke position and the second end.

2. The system of claim 1, wherein at least one recess of the plurality of recesses at each axial position defines a total recess volume at each axial position and the total recess volume at each axial position varies progressively along an axial length of the bore portion with the total recess volume at each axial position increasing away from a mid-stroke position and towards the first and second ends of the bore portion.

3. The system of claim 2, wherein a recess volume-to-spacing ratio is defined by a ratio of the total recess volume at a first axial position to an axial spacing between the at least one recess at the first axial position and a neighboring recess at a second axial position, and wherein the recess volume-to-spacing ratio varies progressively along the axial direction of the bore portion, wherein the recess volume-to-spacing ratio increases away from the mid-stroke position toward the first end and the second end.

4. The system of claim 1, wherein the axial spacing between neighboring axial positions increases at a greater rate between the first end and the first transition point than between the first transition point and the mid-stroke position.

5. The system of claim 1, wherein the axial spacing between neighboring axial positions increases at a greater rate between the second end and the second transition point than between the second transition point and the mid-stroke position.

6. The system of claim 1, wherein the reciprocating piston comprises a piston ring, and wherein the recesses arranged at the first and second transition points comprise widths greater than a width of the piston ring.

7. The system of claim 6, wherein each recess has a length in a direction with a circumferential component, and the lengths of the recesses vary across the plurality of axial positions.

8. The system of claim 1, wherein each recess has a length measured in a direction opposite the width, each of the length and the width defining separate diameters of each recess of the plurality of recesses, and wherein the lengths of the recesses are constant across a single axial position of the plurality of axial positions.

9. An engine system, comprising:
a plurality of pistons positioned to oscillate within a plurality of combustion chambers, wherein each piston comprises one or more piston rings and wherein each combustion chamber comprises a liner comprising a plurality of recesses, wherein a volume of the plurality of recesses increases toward a top-dead center position and a bottom-dead center position from a mid-stroke position of a piston;

wherein a first spacing between recesses decreases from the mid-stroke toward the top-dead center position and the bottom-dead center position, the first spacing measured along a circumference of the liner; and wherein a second spacing between recesses increases from the top-dead center position to a first transition position at a higher rate than a rate of increase of the second spacing between the first transition position to the mid-stroke position, wherein the first transition position is between the top-dead center position and the mid-stroke, and wherein the second spacing is a distance between recesses of the plurality of recesses at different axial positions measured relative to an axial axis along which the piston reciprocates, and wherein the second spacing between recesses increases from the bottom-dead center position to a second transition position at a higher rate than a rate of increase of the second spacing between the second transition position to the mid-stroke position.

10. The engine system of claim 9, wherein a maximum speed of the piston occurs at the mid-stroke position.

11. The engine system of claim 9, wherein the volume of the plurality of recesses is lowest at the mid-stroke and highest at the top-dead center position and the bottom-dead center position.

12. The engine system of claim 9, wherein a width of the plurality of recesses is highest at the mid-stroke and lowest at the top-dead center and bottom-dead center positions, wherein the width is measured along an axial axis about which the piston reciprocates.

13. The engine system of claim 12, wherein the width at the mid-stroke is higher than a width of a piston ring of the piston.

14. The engine system of claim 12, wherein a length of the plurality of recesses is fixed, wherein the length is measured along a circumference of the piston, and wherein the length and the width are equal at the mid-stroke.

15. The engine system of claim 9, wherein a depth of the plurality of recesses increases from the mid-stroke position to each of the top-dead center and the bottom-dead center positions, and where in a number of the plurality of recesses decreases from the mid-stroke position to each of the top-dead center and bottom-dead center positions.

\* \* \* \* \*